(No Model.) 3 Sheets—Sheet 1.
T. B. WILDE.
LAP FEEDING DEVICE FOR CARDING MACHINES.

No. 345,940. Patented July 20, 1886.

Witnesses:
John E. Parker
Henry Bossert

Inventor:
Thomas B. Wilde
by his Attorneys
Howson and Son (No Model.) 3 Sheets—Sheet 3.
T. B. WILDE.
LAP FEEDING DEVICE FOR CARDING MACHINES.
No. 345,940. Patented July 20, 1886.
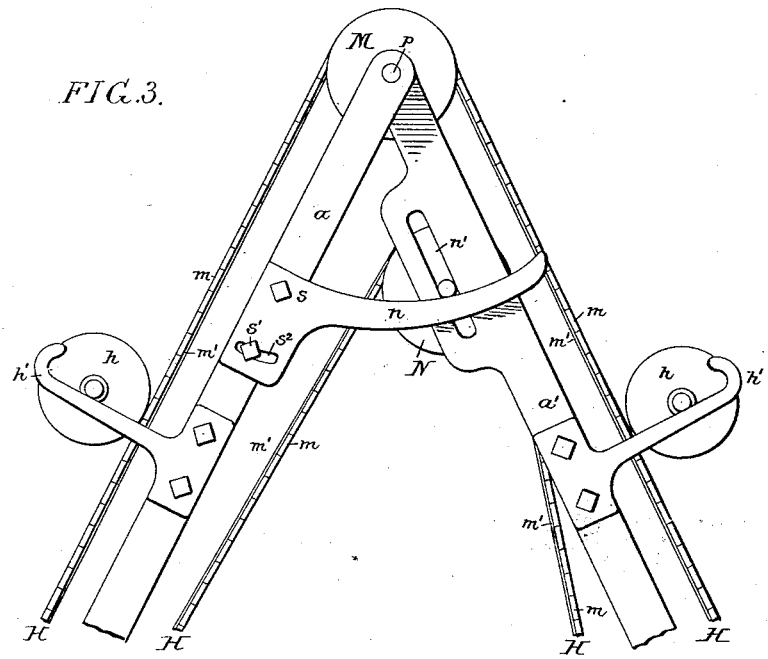
FIG. 3.
FIG. 4.
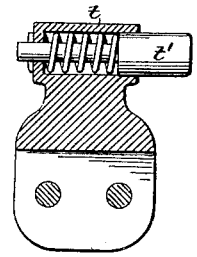
Witnesses:
John E. Parker
Henry Bossert
Inventor:
Thomas B. Wilde
by his Attorneys
Howson and Sons

UNITED STATES PATENT OFFICE.

THOMAS B. WILDE, OF PHILADELPHIA, PENNSYLVANIA.

LAP-FEEDING DEVICE FOR CARDING-MACHINES.

SPECIFICATION forming part of Letters Patent No. 345,940, dated July 20, 1886.

Application filed May 29, 1885. Serial No. 167,023. (No model.)

*To all whom it may concern:*

Be it known that I, THOMAS B. WILDE, a citizen of the United States, and a resident of Philadelphia, Pennsylvania, have invented certain Improvements in Lap-Feeding Devices for Carding-Machines, of which the following is a specification.

My invention consists of certain improvements in the lap-feeding device for carding-machines for which Letters Patent of the United States were granted to Robert Wilde December 18, 1883, No. 290,378, the object of my improvements being to render the machine more active in operation than the machine shown in the former patent.

Figure 1:
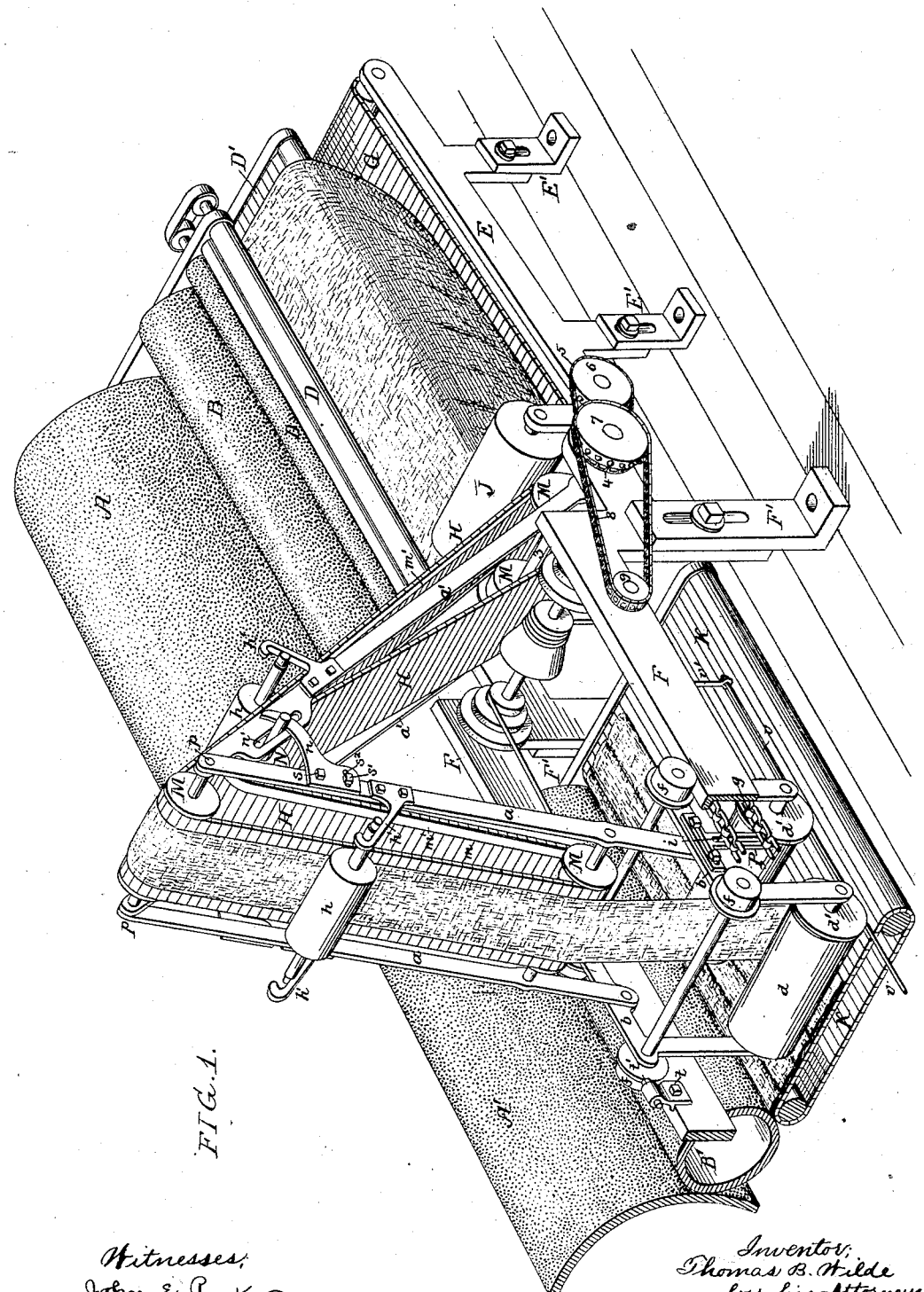
Figure 2:
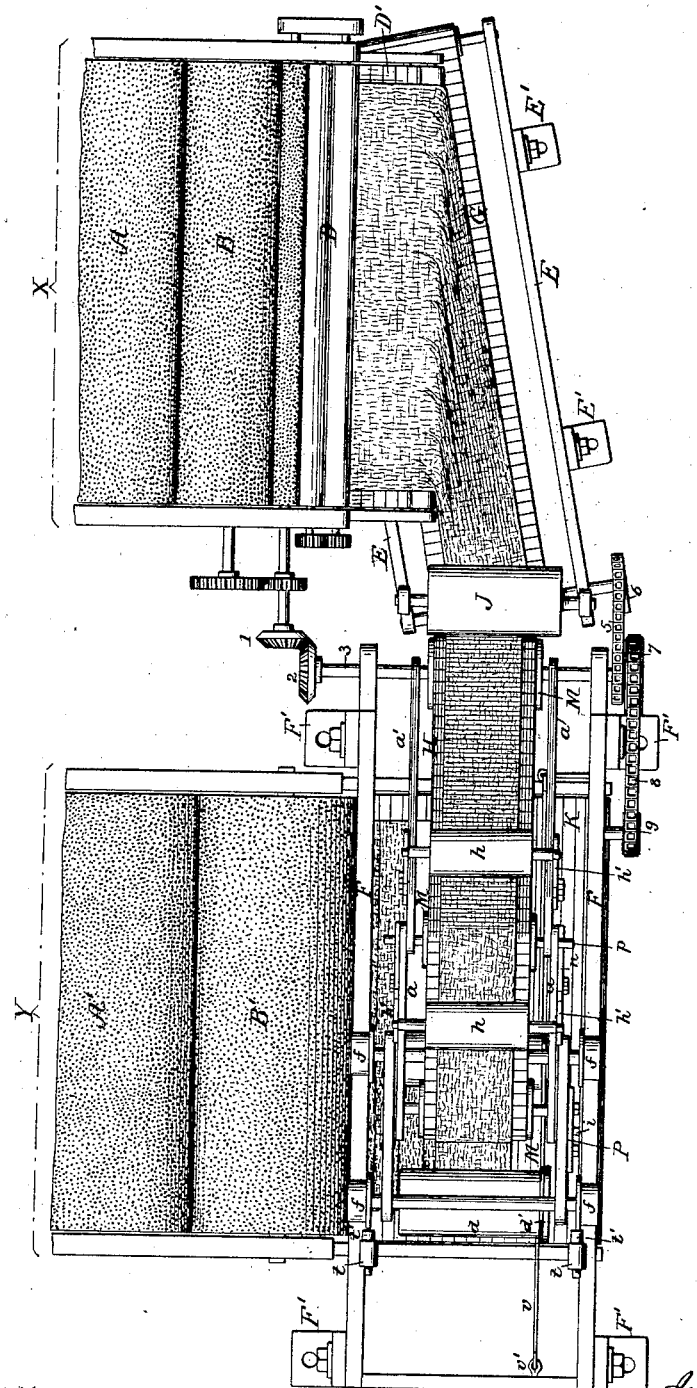

In the accompanying drawings, Figure 1 is a perspective view showing portions of two carding-machines and a lap-conveyer with my improvements; Fig. 2, a plan view of the same; Figs. 3 and 4, detached views illustrating features of the invention.

A represents part of the cylinder of a breaker-card, X, either first or second breaker; B, the doffer of the same; D, the delivery-rolls, and D' an endless belt forming part of the delivery mechanism of the machine, A' representing part of the cylinder of a second breaker or condenser, Y, and B' part of the licker-in of the same, these machines being constructed in any of the usual ways.

Extending transversely to the ends of the carding-machines are frames E F, which support the lap-conveying mechanism, the latter comprising the endless apron G, and the device known as a "camel-back feeder." The drums of the apron G are carried by the frame E, and the camel-back feeder consists of an endless apron, H, carried by rollers, the journals of which are adapted to bearings in opposite pairs of bars $a$ $a'$, jointed together at their upper ends, $p$, the lower ends of the bars $a'$ being hung to fixed pivots on the frame F, and the lower ends of the bars $a$ being pivoted to frames $b$, which carry drums $d$ $d$, and have shafts with wheels $f$, adapted to run on rails formed by the tops of the frames F, said frames $b$ being reciprocated, as usual, by means of an endless belt, $g$, adapted to pulleys on the inside of one of the frames, F, and having a pin, $i$, adapted to a slotted portion of one of the frames $b$, as shown in Fig. 1. The web from the breaker-card is delivered by the endless apron D' onto the apron G, by which the web is doubled or lapped, and thereby thickened prior to passing under a compacting-roller, J, and thence onto the apron H of the camel-back feeder, from which it passes between the rollers $d$ $d$, whereby it is laid on the feeding-apron K of the second breaker or condenser card, the fibrous web or strip being carried to and fro transversely across said apron K, owing to the reciprocation of the frames $b$, the speed of the latter bearing such relation to the speed of the apron that the folds are laid closely together or slightly overlapping each other. This description applies as well to the patented machine as to the present one, but in the latter I have embodied certain improvements in the detailed construction, which improvements I will now proceed to describe. In the first place the endless apron G, instead of being arranged at a right angle to the endless apron D' of the carding-machine, is arranged at an obtuse angle thereto, so that the web delivered by said apron D' is spread over almost the entire width of the apron G—that is to say, that edge of the web on the apron D' which is farthest from the delivery-end of the apron G is deposited close to the outer edge of said apron, while the opposite edge of the web on the apron D' (that is, the edge nearest to the delivery end of the apron G) is deposited close to the inner edge of the said apron G, as shown in Fig. 2. I find that by this means the transfer of the web and the doubling or lapping of the same are effected more acceptably than when the transfer-apron G is arranged at right angles to the delivery-apron D'.

My present machine, moreover, differs materially from that shown in the United States Patent of R. Wilde and T. B. Wilde, No. 226,379, April 6, 1880, for in said machine three conveyer-belts were used, the first receiving the lap from the delivery-belt of the first breaker card and delivering it onto an apron at an angle of forty-five degrees thereto, which in turn delivered it onto an apron at right angles to the first, this latter apron serving to convey the web to the endless apron of the camel-back. The use of this third apron was a necessity in this machine, as it would be impracticable to transfer the light fleecy web of fibers directly to the endless belt of the camel-back from an apron arranged at an angle of forty-five degrees, as was the intermediate apron of the patented machine. The doubled web after passing under the compacting-roller J is fed onto the endless apron H, as in the former machine. While being conveyed by said apron, however, the web is further compacted by being subjected to the action of drums $h$, the spindles of which rest upon fingers $h'$, secured to and projecting upward from the bars $a\ a'$ of the camel-back frame, these fingers being inclined so that while they support the drums $h$ they do not prevent the same from pressing upon the web on the apron H. One only of the drums $h$ may be used, if desired, although it is preferable to use two.

The apron H consists of transverse slats $m$, secured to belts $m'$, the latter being arranged close to the opposite ends of the slats, and being adapted to flanged rollers M, the spindles of which are adapted to bearings in the opposite bars $a\ a'$. In the former machine, drums were used instead of these flanged rollers, and the belts $m'$ were at some distance from the ends of the slats $m$; but the present construction considerably lessens the weight of the device, and provides a more effective support for he belt H. The under portion of the belt H passes over a roller, N, the spindle of which, in the former machine, was carried by spring-hangers; but I find that it is preferable to provide a positive support for this spindle, and I therefore secure to one of the bars $a$ of each side frame of the camel-back an arm, $n$, the spindle of the roller N passing through slots $n'$ in the bars $a'$, and being supported by said arms $n$, the upper or supporting face of each arm being eccentric in respect to the upper joint, $p$, of the bars $a\ a'$, so that as these bars approach and recede from each other in the operation of the machine a rising and falling movement will be imparted to the roller N, said roller rising so as to take up the slack of the apron H when the bars approach each other, and falling as the bars recede from each other.

The bolt $s$, whereby each arm $n$ is hung to the side bar, $a$, serves as a pivot, so that each arm $n$ can be adjusted in order to regulate the degree of eccentricity of the same, the arm being secured in position after adjustment by means of a bolt, $s'$, screwing into the bar $a$ and adapted to a segmental slot, $s^2$, in the arm.

It has been found in practice that the reversal of the movement of the camel-back frame, when the lower ends of the bars $a$ reach the limit of their outward movement, causes a severe strain upon the driving belt $g$, and its pin $i$, owing to the momentum acquired by the said bars during their outward movement, which is facilitated by the weight of the frame. This strain comes upon the pin at a time when it is least prepared to resist it—that is to say, when it is passing round the outer belt-pulley—the strain in this case being directly away from the belt. In consequence the pin $i$ is frequently broken or torn from the belt, and in order to overcome this objection I secure to the opposite frames, F, brackets $t$, carrying spring pins or plungers $t'$, as shown in Fig. 4, these brackets being so arranged that the pins will strike the outer wheels, $f$, of the frames $b$ before the latter reach the limit of their outward movement, this movement being thereby retarded and the momentum arrested before the pin $i$ commences to pass round the outer belt-pulley. The brackets carrying the spring-pins $t'$ are adjustable on the frames F, so as to permit any desired movement of the lower ends of the arms $a$.

It was also discovered that, in working the patented machine, when the drums $d$ struck the edges of the lap upon the apron K they had a tendency to drag the same inward and thus form uneven selvages. This objection I overcome by imparting a rotating movement to the drums, the direction of rotation being reversed when the direction of reciprocation is changed.

The simplest plan of effecting the proper rotation of the drums I find to be by the use of a cord, $v$, secured at its opposite ends to studs $v'$ on the frame F, and passing round each drum $d$, the release of the cord from the drums being prevented by flanges $d'$ at the end of the same.

The frames F, which carry the camel-back feeder, are provided with adjustable legs or feet $F'$, as shown in Figs. 1 and 2, the object being to vertically adjust the frames F and the feeder carried thereby, so as to adapt the same to different styles of carding-machines, the height of the feed-apron K above the floor varying, in different machines, from eighteen to twenty-six inches. For the same reason the frames E, which carry the transfer-apron G, are provided with adjustable feet $E'$.

The gearing whereby the transfer-apron and the camel-back feeder are driven may be varied as circumstances may suggest without departing from my invention. In the present instance, a bevel-pinion, 1, on one of the shafts of the carding-machine X, gears into a bevel-wheel, 2, on a shaft, 3, which is adapted to bearings in the frames F and carries the drive-rollers M of the apron H. On the projecting portion of this shaft are two chain-wheels, 4 and 7. The wheel 4 is geared by a belt, 5, to a wheel, 6, on the spindle of one of the drums of the apron G, and the wheel 7 is geared by a belt, 8, to a chain-wheel, 9, on a spindle which carries one of the pulleys of the chain $g$.

I am aware that elastic stops have been used as picker-checks for looms as a means of checking the movement of the carriage of a spinning-mule and in various other machines; but as used in such machines the elastic stop does not affect the action of the driving or operating device, whereas in my machine the elastic stop, occupying a specified relation to the belt-and-pin-driving mechanism, serves to overcome an objection to which this special form of driver is subject, as before set forth.

I claim as my invention—

1. The combination of the delivery mechanism of a carding-machine, a camel-back feeder, and a transfer-apron arranged at an obtuse angle in respect to said delivery mechanism, and serving to receive the web therefrom to convey it to the endless belt of the camel-back, and to deliver it directly to said belt, all substantially as specified.

2. The combination of the pivoted frames and endless apron of a camel-back feeder with a compacting-roll, $h$, located below the top of the apron, and with fingers projecting from the bars of the frame and forming inclined bearings for the journal of the roll, as specified.

3. The combination of the jointed bars $a\ a'$, forming the frame of the camel-back, mechanism for reciprocating the lower ends of the bars $a$, the endless apron, the supporting-roll N, and the eccentric-arms $n$, forming supports for the spindle of said roll, as set forth.

4. The combination of the camel-back frame and its slotted arm, the endless belt having a finger adapted to the slot of the arm, means for driving the belt, and elastic stops for retarding the outward movement of the lower portion of the frame when the pin is passing around the outer belt-drum, as specified.

5. The combination of the reciprocating frame, the drums $d\ d$, carried thereby, and the cord $v$, secured at its opposite ends and passing round the drums, as set forth.

In testimony whereof I have signed my name to this specification in the presence of two subscribing witnesses.

THOMAS B. WILDE.

Witnesses:
 HENRY BOSSERT,
 HARRY SMITH.